United States Patent
Sung et al.

(10) Patent No.: US 10,971,754 B2
(45) Date of Patent: Apr. 6, 2021

(54) METHOD FOR MANUFACTURING NEGATIVE ACTIVE MATERIAL, AND NEGATIVE ACTIVE MATERIAL AND LITHIUM SECONDARY BATTERY USING SAME

(71) Applicants: LG CHEM, LTD., Seoul (KR); CHUNG ANG UNIVERSITY INDUSTRY ACADEMIC COOPERATION FOUNDATION, Seoul (KR)

(72) Inventors: Da Young Sung, Daejeon (KR); Myung Gil Kim, Seoul (KR); Minchul Jang, Daejeon (KR); Hyewon Hwang, Daejeon (KR)

(73) Assignees: LG CHEM, LTD., Seoul (KR); CHUNG ANG UNIVERSITY INDUSTRY ACADEMIC COOPERATION FOUNDATION, Seoul (KR)

(*) Notice: Subject to any disclaimer, the term of this patent is extended or adjusted under 35 U.S.C. 154(b) by 119 days.

(21) Appl. No.: 16/469,328

(22) PCT Filed: Aug. 28, 2018

(86) PCT No.: PCT/KR2018/009906
§ 371 (c)(1),
(2) Date: Jun. 13, 2019

(87) PCT Pub. No.: WO2019/045408
PCT Pub. Date: Mar. 7, 2019

(65) Prior Publication Data
US 2020/0112051 A1    Apr. 9, 2020

(30) Foreign Application Priority Data

Sep. 1, 2017  (KR) .................. 10-2017-0112012
Aug. 24, 2018  (KR) .................. 10-2018-0099369

(51) Int. Cl.
*H01M 10/0525*    (2010.01)
*H01M 4/58*    (2010.01)
(Continued)

(52) U.S. Cl.
CPC ....... *H01M 10/0525* (2013.01); *C01B 21/097* (2013.01); *H01M 4/587* (2013.01);
(Continued)

(58) Field of Classification Search
CPC ........... H01M 10/052; H01M 10/0525; H01M 2004/027; H01M 4/366; H01M 4/382;
(Continued)

(56) References Cited

U.S. PATENT DOCUMENTS

2005/0084760 A1    4/2005 Hwang et al.
2005/0089759 A1    4/2005 Hwang et al.
(Continued)

FOREIGN PATENT DOCUMENTS

CN    101752552 A    6/2010
JP    2003-59492 A    2/2003
(Continued)

OTHER PUBLICATIONS

International Search Report (PCT/ISA/210) issued in PCT/KR2018/009906, dated Jan. 16, 2019.
(Continued)

*Primary Examiner* — Carlos Barcena
(74) *Attorney, Agent, or Firm* — Birch, Stewart, Kolasch & Birch, LLP

(57) ABSTRACT

A method for preparing a negative electrode active material, a negative electrode active material prepared using the same, and a lithium secondary battery, and in particular, to a method for preparing a negative electrode active material including the steps of (a) preparing a coating composition including a precursor of metal-phosphorus-oxynitride; (b)
(Continued)

forming a precursor layer on a negative electrode active material with the coating composition of (a) using a solution process; and (c) forming a metal-phosphorus-oxynitride protective layer on the negative electrode active material by heat treating the negative electrode active material having the precursor layer formed thereon. The method for preparing a negative electrode active material uses a solution process, which is advantageous in terms of simplifying the whole process and reducing costs, and high capacity, high stabilization and long lifetime are obtained as well by the formed protective layer having excellent properties.

13 Claims, 4 Drawing Sheets

(51) Int. Cl.
*H01M 4/587* (2010.01)
*H01M 4/62* (2006.01)
*C01B 21/097* (2006.01)
*H01M 4/02* (2006.01)

(52) U.S. Cl.
CPC .......... *H01M 4/5825* (2013.01); *H01M 4/62* (2013.01); *H01M 2004/027* (2013.01)

(58) Field of Classification Search
CPC ........ H01M 4/386; H01M 4/387; H01M 4/48; H01M 4/5825; H01M 4/587; H01M 4/62
See application file for complete search history.

(56) References Cited

U.S. PATENT DOCUMENTS

| | | |
|---|---|---|
| 2005/0095504 A1 | 5/2005 | Kim et al. |
| 2012/0100438 A1 | 4/2012 | Fasching et al. |
| 2012/0196186 A1 | 8/2012 | Richard |
| 2014/0178752 A1 | 6/2014 | Park et al. |
| 2015/0214529 A1 | 7/2015 | Yawata et al. |
| 2015/0325854 A1 | 11/2015 | Kim et al. |
| 2016/0351910 A1* | 12/2016 | Albano .................. H01M 4/587 |
| 2016/0351950 A1 | 12/2016 | Ohuchi et al. |

FOREIGN PATENT DOCUMENTS

| | | |
|---|---|---|
| JP | 2005-108835 A | 4/2005 |
| JP | 2005-129535 A | 5/2005 |
| JP | 2013-545228 A | 12/2013 |
| JP | 2014-505340 A | 2/2014 |
| JP | 2014-78434 A | 5/2014 |
| JP | 2015-216101 A | 12/2015 |
| KR | 10-0542198 B1 | 1/2006 |
| KR | 10-2013-0095065 A | 8/2013 |
| KR | 10-2014-0001905 A | 1/2014 |
| KR | 10-2014-0017816 A | 2/2014 |
| KR | 10-2014-0082565 A | 7/2014 |
| KR | 10-2015-0077053 A | 7/2015 |
| KR | 10-2016-0034183 A | 3/2016 |
| KR | 10-2016-0066227 A | 6/2016 |
| KR | 10-2018-0003682 A | 1/2018 |

OTHER PUBLICATIONS

Song et al., "Stabilization of Thin Film LiCoO$_2$ Electrode by LiPON Coating", Electrochemical and Solid-State Letters, 2011, vol. 14, No. 2, pp. A11-A13.

Chiu et al., "Lithium Phosphorus Oxynitride Solid-state Thin-film Electrolyte Deposited and Modified by Bias Sputtering and Low Temperature Annealing," J. Vac. Sci. Technol. A, vol. 28, No. 4, Jul./Aug. 2010 ((Published Jun. 16, 2010), pp. 568-572.

Extended European Search Report, dated Nov. 27, 2019, for European Application No. 18849998.2.

* cited by examiner

METHOD FOR MANUFACTURING NEGATIVE ACTIVE MATERIAL, AND NEGATIVE ACTIVE MATERIAL AND LITHIUM SECONDARY BATTERY USING SAME

TECHNICAL FIELD

This application claims the benefits of Korean Patent Application No. 10-2017-0112012, filed on Sep. 1, 2017 with the Korean Intellectual Property Office and Korean Patent Application No. 10-2018-0099369, filed on Aug. 24, 2018 with the Korean Intellectual Property Office, the disclosure of which are herein incorporated by reference in their entirety.

The present invention relates to a method for preparing a negative electrode active material, a negative electrode active material using the same and a lithium secondary battery.

BACKGROUND ART

As portable electronic devices, electric vehicles and large capacity energy storage system and the like have been recently developed, demands for large capacity batteries as an energy source have increased, and in response to such demands, extensive studies on batteries have been performed. Among many secondary batteries, lithium secondary batteries having advantages of high energy density, discharge voltage and output stability have received attention.

A lithium secondary battery has a structure of laminating or winding an electrode assembly including a positive electrode, a negative electrode, and a separator interposed between the positive electrode and the negative electrode, and is formed by embedding this electrode assembly in a battery case, and injecting a non-aqueous electrolyte thereinto. Herein, capacity of the lithium secondary battery varies depending on the electrode active material type, and since capacity sufficient as theoretical capacity is not secured during an actual operation, commercialization has not been successful.

As a negative electrode active material of a lithium secondary battery, carbon-based materials such as crystalline carbon including natural graphite or artificial graphite, or amorphous (low crystalline) carbon having a pseudo-graphite structure or a turbostratic structure obtained by carbonizing hydrocarbon, a polymer or the like at a temperature of 1000° C. to 1500° C. are generally used. Such carbon-based materials have advantages of having low standard redox potential of approximately −3 V with respect to standard hydrogen electrode (SHE) potential, and having excellent charge and discharge reversibility with a layer structure very useful for lithium ion intercalation and deintercalation. However, there is a limit in obtaining high capacity since graphite has low theoretical capacity of 372 mAh/g.

In order to obtain a high capacity lithium secondary battery, metal-based materials having high theoretical capacity such as lithium (3,860 mAh/g), silicon (4,200 mAh/g) or tin (990 mAh/g) have been used as a negative electrode active material. However, when using metals such as lithium, silicon or tin as a negative electrode active material, the volume greatly expands by 4 times or so during a charging process of alloying with lithium, and shrinks during discharge. Due to such large variations in the electrode volume repeatedly occurring during charge and discharge, the active material is slowly micronized and detached from the electrode causing a rapid capacity decrease, an as a result, commercialization has not been successful since stability and reliability are difficult to secure.

Meanwhile, the negative electrode active material and an electrolyte react to form a passivation layer (solid electrolyte interphase; SEI) on the surface, and this may cause an irreversible capacity decrease. In addition, the formed passivation layer causes local differences in the current density forming a dendritic lithium dendrite on the negative electrode active material surface. The lithium dendrite causes a battery internal short circuit and inactive lithium (dead lithium) as well as shortening a lifetime of a lithium secondary battery, and by adding physical and chemical instability of the lithium secondary battery, adversely affects battery capacity, cycle property and lifetime. In addition thereto, the passivation layer is thermally unstable, and may be slowly destroyed by increased electrochemical energy and thermal energy during a battery charging and discharging process, particularly, during high temperature storage in a completely charged state. Due to such passivation layer destruction, a reaction decomposing an electrolyte by the exposed negative electrode active material surface directly reacting with the electrolyte consistently occurs, and as a result, negative electrode resistance increases, and battery charge and discharge efficiency decreases.

In view of the above, various methods have been studied in order to improve lifetime properties and electrochemical properties of a negative electrode active material.

As one example, Korean Patent Application Publication No. 2015-0077053 discloses that lifetime and performance of a negative electrode active material and a secondary battery including the same may be enhanced by forming a ceramic coating layer including aluminum oxide, zirconium oxide and the like on a surface of a negative electrode active material core including a silicon single phase and a silicon alloy phase.

In addition, Korean Patent Application Publication No. 2016-0034183 discloses that electrolyte liquid loss and dendrite formation may be prevented by forming a protective layer with a polymer matrix capable of accumulating an electrolyte liquid while protecting a negative electrode on a negative electrode active layer including lithium metal or a lithium alloy.

The prior art documents have somewhat improved reaction stability of a negative electrode active material for an electrolyte through a separate layer, however, the effect has not been sufficient. In addition, a separate process is required for layer formation, or degeneration such as a protective layer being hardened or swollen occurs when driving a battery, which limits the application. Accordingly, development of a negative electrode active material minimizing initial irreversible capacity and having excellent stability has been more required for enhancing performance and lifetime of a lithium secondary battery.

PRIOR ART DOCUMENTS

Patent Documents

Korean Patent Application Publication No. 2015-0077053 (2015 Jul. 7), Negative Electrode Active Material, Secondary Battery Comprising Same and Method for Manufacturing Negative Electrode Active Material Korean Patent Application Publication No. 2016-0034183 (2016 Mar. 29), Negative Electrode for Lithium Secondary Battery and Lithium Secondary Battery Comprising Same

DISCLOSURE

Technical Problem

As a result of extensive studies in view of the above, the inventors of the present invention have identified that, when forming a metal-phosphorus-oxynitride metal-phosphorus-oxynitride protective layer on a negative electrode active material through a solution process by preparing a coating composition including a precursor of metal-phosphorus-oxynitride in a solution state, the corresponding protective layer is readily formed and lifetime properties of a negative electrode active material are also enhanced by having an excellent coating property, and have completed the present invention.

Accordingly, an aspect of the present invention provides a method for preparing a negative electrode active material capable of preparing a metal-phosphorus-oxynitride protective layer having excellent properties on a negative electrode active material using a process simpler than conventional processes.

Another aspect of the present invention provides a negative electrode active material prepared according to the above-described preparation method, and a lithium secondary battery including the same.

Technical Solution

According to an aspect of the present invention, there is provided a method for preparing a negative electrode active material comprising: (a) preparing a coating composition including a precursor of metal-phosphorus-oxynitride; (b) forming a precursor layer on a negative electrode active material with the coating composition of (a) using a solution process; and (c) forming a metal-phosphorus-oxynitride protective layer on the negative electrode active material by heat treating the negative electrode active material having the precursor layer formed thereon.

The precursor of metal-phosphorus-oxynitride may be prepared by a reaction of a compound including a phosphorus-nitrogen bond with a metal salt compound.

The compound including a phosphorus-nitrogen bond may comprise at least one selected from the compounds represented by the following Chemical Formulae 1 to 3:

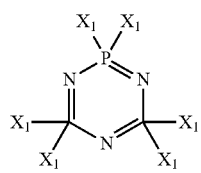

[Chemical Formula 1]

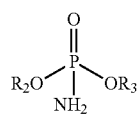

[Chemical Formula 2]

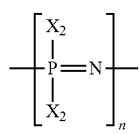

[Chemical Formula 3]

wherein $X_1$, $X_2$, $R_1$ to $R_7$ and n follow descriptions provided in the specification.

The metal salt compound may comprise at least one metal selected from the group consisting of lithium, sodium, magnesium, calcium, zinc and aluminum.

The coating composition may comprise the compound including a phosphorus-nitrogen bond, the metal salt compound and an organic solvent.

The coating composition may comprise the compound including the phosphorus-nitrogen bond in an amount of from 0.002 to 27% by weight, the metal salt compound in an amount of from 0.0005 to 12% by weight and the organic solvent in an amount of from 70 to 99.99% by weight based on a total weight of the composition.

The coating composition may further comprise a chalcogen compound.

The negative electrode active material may comprise at least one selected from the group consisting of lithium metal, lithium alloys, transition metal composite oxides, silicon-based materials, tin-based materials and carbon-based materials.

The negative electrode active material may have a spherical, an elliptical, a spindle, a scaly, a plate, a fibrous, a rod, a core-shell or an atypical shape.

In the step (b), the solution process may use at least one method of spray coating, spin coating, dip coating, inkjet printing, offset printing, reverse offset printing, gravure printing and roll printing.

In the step (c), the heat treatment may be carried out in a temperature range of 150° C. or higher and lower than 500° C.

Prior to the step (c), removing the organic solvent included in the precursor layer formed from the step (b) may be further comprised.

According to another aspect of the present invention, there is provided a negative electrode active material prepared using the preparation method.

According to still another aspect of the present invention, there is provided a lithium secondary battery including the negative electrode active material.

Advantageous Effects

A method for preparing a negative electrode active material according to the present invention is capable of readily forming a protective layer including metal-phosphorus-oxynitride and/or a derivative thereof on a negative electrode active material through a solution process using a liquid coating composition including a precursor of metal-phosphorus-oxynitride. Accordingly, a negative electrode active material can be prepared through a simple reaction under a mild condition, and in addition thereto, preparation costs can be minimized and preparation time can be shortened making commercial application possible. In addition, by having excellent reaction stability with an electrolyte liquid and having ion conductivity, a negative electrode active material provided with a protective layer prepared according to the preparation method of the present invention is capable of providing a negative electrode active material with high capacity and long lifetime, and is also capable of enhancing capacity and lifetime properties of a lithium secondary battery including the same.

BEST MODE

Figure 1:
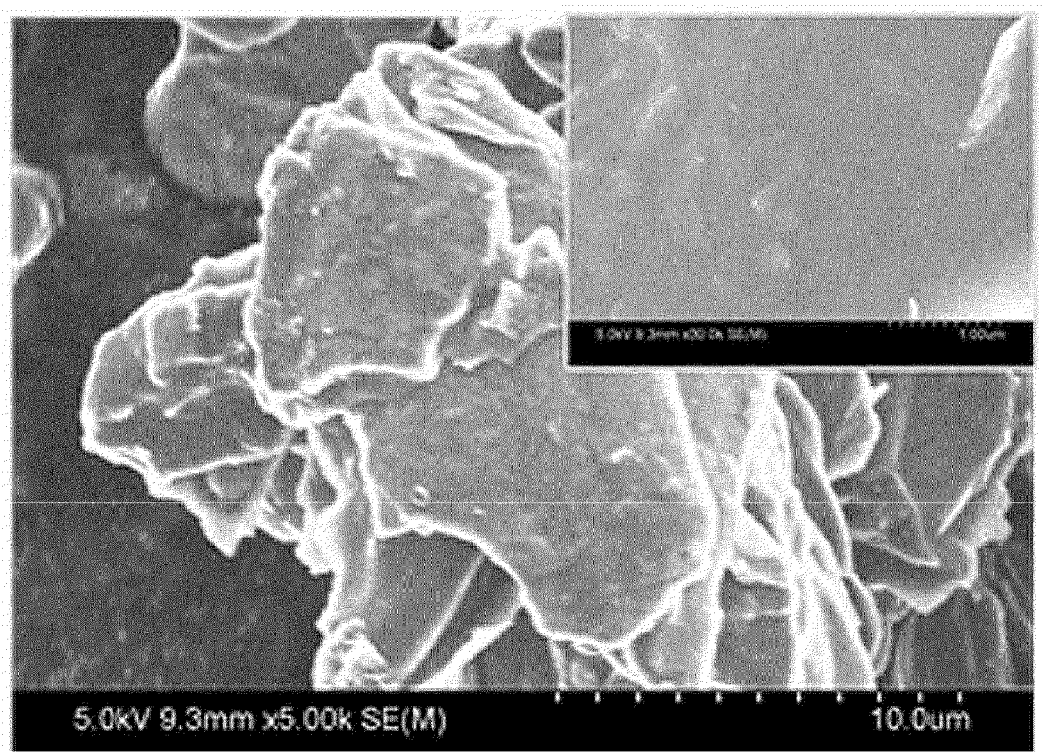
FIG. 1 is a scanning electron microscope image of a negative electrode active material prepared in Comparative Example 1 of the present invention.

Hereinafter, the present invention will be described in more detail.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Terms used in the present invention are for describing specific embodiments only and do not intend to limit the present inventive. Singular forms used herein include plural forms as well, unless the context clearly indicates otherwise. In the present invention, terms such as "include" or "have" are to specify the presence of features, numbers, steps, behaviors, constituents, components or combinations thereof described in the specification, and need to be construed as not excluding the possibility of presence or addition of one or more other features, numbers, steps, behaviors, constituents, components or combinations thereof.

As applications of lithium secondary batteries expand starting from mobile phones, wireless electronic devices to electric vehicles, there have been demands for the development of lithium secondary batteries that are smaller, lighter, thinner and portable, and having high performance, long lifetime and high reliability.

In response to such demands, various materials are used and developed as a negative electrode active material. However, in actual operations, it is difficult to sufficiently secure lifetime properties since cycle efficiency and stability are insufficient as well as failing to obtain full theoretical capacity and energy density. This is due to the fact that output properties decline by initial irreversible capacity (initial charge capacity-initial discharge capacity) and resistance increasing as a battery cycle is progressed due to a passivation layer produced on a negative electrode surface, and stability of the negative electrode decreases, as the volume changes during charge and discharge and lithium dendrite grows.

In view of the above, methods of varying a composition of a negative electrode active material or introducing a protective layer on the surface have been proposed in the prior art, however, the methods have not been able to effectively improve lifetime properties of a negative electrode active material, and are not proper to be commercially used in terms of productivity, process efficiency and economic feasibility.

Therefore, the present invention provides a method for preparing a negative electrode active material, which is forming a protective layer on a negative electrode active material using a solution process in order to uniformly form a protective layer including a specific compound on a surface of the negative electrode active material through a simple process, and to secure effects of improving performance and lifetime of a lithium secondary battery including the same.

The method for preparing a negative electrode active material according to one embodiment of the present invention comprises the steps of (a) preparing a coating composition including a precursor of metal-phosphorus-oxynitride; (b) forming a precursor layer on a negative electrode active material with the coating composition using a solution process; and (c) forming a metal-phosphorus-oxynitride protective layer on the negative electrode active material by heat treating the precursor layer-formed negative electrode active material.

Hereinafter, the present invention will be described in more detail by each step.

First, the step (a) prepares a coating composition including a precursor of metal-phosphorus-oxynitride.

The coating composition may comprise a compound including phosphorus (P)-nitrogen (N) bonds, a metal salt compound and an organic solvent.

The compound including a phosphorus-nitrogen bond of the present invention is one type of a skeleton compound including a phosphorus-nitrogen bond, and performs a role of providing a phosphorus-nitrogen-oxygen skeleton, a lattice structure of metal-phosphorus-oxynitride lastly produced by heat treatment to describe below. Herein, the phosphorus-nitrogen bond may be a single bond or a double bond.

The compound including a phosphorus-nitrogen bond may be at least one selected from the compounds represented by the following Chemical Formulae 1 to 3:

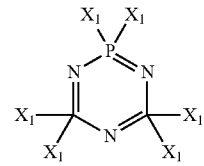

[Chemical Formula 1]

wherein each $X_1$ is the same or different from each other and each independently is $OR_1$, F, Cl, Br or I, wherein $R_1$ is an alkyl group having 1 to 5 carbon atoms;

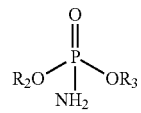

[Chemical Formula 2]

wherein $R_2$ and $R_3$ are the same or different from each other and each independently is an alkyl group having 1 to carbon atoms or an aryl group having 6 to 20 carbon atoms;

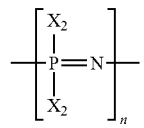

[Chemical Formula 3]

wherein each $X_2$ is the same or different from each other and each independently is $R_4$, $OR_5$, $NR_6R_7$, F, Cl, Br or I, wherein $R_4$ to $R_7$ are the same or different from each other and each independently an alkyl group having 1 to 10 carbon atoms or an aryl group having 6 to 20 carbon atoms and n is an integer of 100 to 100,000.

The term "alkyl group" used in the present invention may be linear or branched, and although not particularly limited thereto, the number of carbon atoms is preferably from 1 to 10. Specific examples thereof may include a methyl group, an ethyl group, a propyl group, an isopropyl group, a butyl group, a t-butyl group, a pentyl group, a hexyl group, a heptyl group and the like, but are not limited thereto.

The term "aryl group" used in the present invention means a single or multi aromatic carbon-based ring having 6 to 20 carbon atoms. Examples of the aryl group may include a phenyl group, a biphenyl group, a fluorene group and the like, but are not limited thereto.

The compound including a phosphorus-nitrogen bond may be a monomer compound represented by Chemical Formula 1 or 2, a polymer compound represented by Chemical Formula 3, or a mixture thereof.

For example, the compound including a phosphorus-nitrogen bond may comprise at least one selected from the group consisting of hexachlorophosphazene, hexafluorophosphazene, hexabromophosphazene, hexaiodophosphazene, hexamethylphosphoramide, diethyl phosphoramidate, diphenyl phosphoramidate, poly(dichlorophosphazene), poly(bis(ethoxy)phosphazene) and poly(bis(phenoxy)phosphazene). Preferably, the compound including a phosphorus-nitrogen bond may include at least one selected from the group consisting of hexachlorophosphazene, diphenyl phosphoramidate and poly(dichlorophosphazene).

The compound including a phosphorus-nitrogen bond may be included in an amount of from 0.002 to 27% by weight based on the total weight of the coating composition. Herein, when a solvent is excluded from the coating composition of the present invention, the compound including a phosphorus-nitrogen bond may be included in an amount of from 20 to 90% by weight and preferably in an amount of from 50 to 80% by weight based on the total weight of the solid content of the coating composition. When the content of the compound including a phosphorus-nitrogen bond included in the coating composition is less than the above-mentioned range, formation of metal-phosphorus-oxynitride, a final product, may not be uniform throughout, and the content being greater than the above-mentioned range may cause unnecessary reactions adversely affecting a protective layer composition or battery performance, or resulting in decline in the battery properties due to excessively formed electrical resistance, and therefore, a proper content is preferably determined within the above-mentioned range. However, a specific optimal content of the compound including a phosphorus-nitrogen bond may be set to vary depending on a negative electrode active material to provide and other properties and usage environments of a battery provided therewith, and such applications are not meant to be limited by the above-mentioned preferred range.

The metal salt compound of the present invention is not particularly limited as long as it is capable of providing metal cations by being dissociated into cations and anions in an organic solvent, and those generally used in the art may be used without limit.

The metal salt compound is a salt comprising at least one metal selected from the group consisting of monovalent metals such as lithium (Li) or sodium (Na); divalent metals such as magnesium (Mg), calcium (Ca) or zinc (Zn); and trivalent metals such as aluminum (Al), and may have various forms such as halides, hydroxides, acetates, alkoxides and the like.

For example, the metal salt compound may be a lithium salt including a lithium ion (Li+) as a monovalent metal cation, and wherein the lithium salt may be $CH_3COOLi$, LiX (herein, X represents F, Cl, Br or I), $LiNO_3$, LiOH, LiOR (herein, R represents an alkyl group having 1 to 5 carbon atoms) or the like. In addition, when the metal salt compound is a magnesium salt including a magnesium ion ($Mg^{2+}$) as a divalent metal cation, the magnesium salt may be $(CH_3COO)_2Mg$, $MgX_2$ (herein, X represents F, Cl, Br or I) or the like.

The metal salt compound may be included in an amount of from 0.005 to 12% by weight based on the total weight of the coating composition. Herein, when a solvent is excluded from the coating composition of the present invention, the metal salt compound may be included in an amount of from 5 to 40% by weight and preferably in an amount of from 10 to 30% by weight. When the content of the metal salt compound is less than the above-mentioned range, ion conductivity of the protective layer aimed in the present invention is difficult to secure, and when the content is greater than the above-mentioned range on the contrary, formation of heterogeneous layer and resistance increase decreasing ion mobility, and side reactions on the negative electrode active material surface may not be suppressed or battery performance may decline, and therefore, the content is properly controlled within the above-mentioned range.

The organic solvent of the present invention is to provide metal cations by ionizing the above-described metal salt compound. The organic solvent may be a protic solvent of an aprotic polar solvent.

Examples of the organic solvent may include dimethylsulfoxide (DMSO), N,N-dimetylformamide, N-methylformamide, methanol, ethanol, isopropanol, 2-methoxyethanol, water and the like. These may be used either each alone or as a mixture of two or more.

The organic solvent may be included in an amount of from 70 to 99.99% by weight and preferably in an amount of from 80 to 99.9% by weight based on the total weight of the coating composition. When the content of the organic solvent is less than the above-mentioned range, the metal salt compound is not sufficiently dissolved, and decline in the negative electrode active material performance may occur due to side reactions, and the layer having a uniform thickness is difficult to form. When the content is greater than the above-mentioned range on the contrary, excess energy is consumed in the solvent-removing process, and as a result, economic feasibility and productivity decrease, and target protective layer functions are difficult to obtain.

The coating composition including the above-described components is uniformly mixed in the organic solvent to form a precursor of metal-phosphorus-oxynitride for forming metal-phosphorus-oxynitride. The precursor of metal-phosphorus-oxynitride is prepared by a reaction of the compound including a phosphorus-nitrogen bond and the metal salt compound.

Herein, the coating composition may be heated at a predetermined temperature after mixing the above-described components. For example, the coating composition may be heated at a temperature of 4 from 0 to 150° C. before being used in a solution process, a follow-up process. Such a heating process is for a sort of pretreatment, and the precursor partially replicating a lattice structure of the metalphosphorus-oxynitride obtained by the reaction of the components forming the coating composition may be more readily formed.

The coating composition may further comprise a chalcogen compound (chalcogenide).

The chalcogen compound has excellent electric conductivity, and when the coating composition further comprises the chalcogen compound, chalcogen elements are included in the lattice structure of the metal-phosphorus-oxynitride finally formed, which further enhances conductivity.

For example, the chalcogen compound may comprise at least one selected from the group consisting of $TiS_2$, $VS_2$, $FeS_2$, $MoS_2$, $CoS_3$, $TiSe_2$, $VSe_2$, $NbSe_3$, $SeO_2$, $TiTe_2$, $VTe_2$, $LiTiS_2$ and $LiVS_2$.

Subsequently, in the step (b), a precursor layer is formed on a negative electrode active material with the coating composition prepared in the step (a) described above using a solution process.

A precursor layer is formed by coating the coating composition on a negative electrode active material, and deposition processes such as sputtering or vapor deposition have been used in the prior art when forming a protective layer on a negative electrode active material. Forming a protective layer using the deposition process leads to excellent results in terms of quality, however, the process is difficult to apply when the object is a particle, and, since the work needs to be done in a vacuum state and a separate device is required, it is not commercially suited in terms of time, costs and quantity. In comparison, the coating composition is prepared in a liquid state in the step (a) in the present invention, which is suitable to be used in a solution process, and therefore, unlike existing deposition processes, the process may be applied to various shapes. In addition, by using a solution process in the present invention, coating uniformity of a protective layer is very superior, and advantages are also obtained in terms that the process may be simplified, and process time and costs are greatly reduced.

As the solution process, at least one method of spray coating, spin coating, dip coating, inkjet printing, offset printing, reverse offset printing, gravure printing and roll printing may be used.

Herein, as the negative electrode active material, a coating target, all negative electrode active materials known in the art as those used in a lithium secondary battery may be used.

The negative electrode active material is a material capable of reversibly intercalating or deintercalating lithium ions ($Li^+$), or capable of reversibly forming a lithium-containing compound by reacting with lithium ions, and may comprise at least one selected from the group consisting of lithium metal, lithium alloys, transition metal composite oxides, silicon-based materials, tin-based materials and carbon-based materials. Examples of the negative electrode active material may include one selected from the group consisting of carbon-based materials selected from the group consisting of crystalline artificial graphite, crystalline natural graphite, amorphous hard carbon, low-crystalline soft carbon, carbon black, acetylene black, ketjen black, Super-P, graphene and fibrous carbon; transition metal composite oxides such as silicon-based materials, $Li_xFe_2O_3$ ($0 \leq x \leq 1$), $Li_xWO_2$ ($0 \leq x \leq 1$) or $Sn_xMe_{1-x}Me'_yO_z$ (Me: Mn, Fe, Pb, Ge; Me': Al, B, P, Si, groups 1, 2 and 3 elements in the periodic table, halogen; $0<x\leq1$; $1\leq y\leq3$; $1\leq z\leq8$); lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ or $Bi_2O_5$; conductive polymers such as polyacetylene; Li—Co—Ni-based materials; titanium oxides; lithium titanium oxides and the like, but are not limited thereto.

In addition, the negative electrode active material may have a spherical, an elliptical, a spindle, a scaly, a plate, a fibrous, a rod, a core-shell or an atypical shape.

As one example, when the negative electrode active material has a spherical particle form, the particle-formed negative electrode active material is introduced to the coating composition and then stirred to coat a precursor layer on the negative electrode active material surface.

The solution process may be performed under an inert atmosphere such as nitrogen or argon, or under a dry air condition of relative humidity of 5% or less.

After forming a precursor layer on the negative electrode active material through the step (b) of the present invention, an organic solvent removing process may be performed before a heat treatment process for forming a metal-phosphorus-oxynitride protective layer. The organic solvent removing process is a heat treatment process performed at a lower temperature than the heat treatment process for forming a protective layer, and the temperature of the organic solvent removing process may vary depending on the type of the organic solvent included in the coating composition. The organic solvent removing process may be performed at a temperature close to a boiling point of the organic solvent, for example, at 40° C. to 150° C. By performing the organic solvent removing process, mechanical stress of a protective layer caused by a volume decrease after the heat treatment process forming the protective layer to describe below may be reduced. Accordingly, a protective layer evenly coated on the whole negative electrode active material may be formed. The organic solvent removing process may also be performed under an inert atmosphere such as nitrogen or argon, or under a dry air condition of relative humidity of 5% or less.

Subsequently, in the step (c), the precursor layer-formed negative electrode active material prepared in the step (b) described above is heat treated to form a metal-phosphorus-oxynitride protective layer on the negative electrode active material.

The components forming the precursor layer go through a heat polymerization reaction through the heat treatment process in the step (c) of the present invention to form metal-phosphorus-oxynitride or a derivative thereof, and a protective layer including the same is formed. In the heat polymerization reaction, the components included in the precursor layer go through a ring opening reaction, a condensation reaction and a polymerization reaction to form metal-phosphorus-oxynitride in a mixed form of phosphorus and nitrogen. Herein, a phosphorus-nitrogen-oxygen skeleton in which one nitrogen bonds to two or three atoms is formed. While the heat polymerization reaction occurs in the heat treatment process, impurities unwanted in the reaction may be removed by heat. The impurities may include carbon, hydrogen, chlorine and the like included in the coating composition.

The metal-phosphorus-oxynitride included in the protective layer may include chemical structures represented by the following Chemical Formulae 4 and 5, and these may include an amorphous phase of the metal-phosphorus-oxynitride. Herein, $M^{n+}$ in each of the following Chemical Formulae 4 and 5 represents a monovalent, divalent or trivalent metal cation. In other words, M represents a metal type and n represents any one integer of 1 to 3, and $M^{n+}$ may represent $Li^+$, $Mg^{2+}$, $Al^{3+}$ and the like.

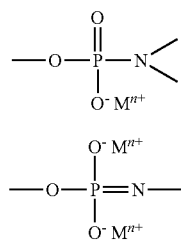

[Chemical Formula 4]

[Chemical Formula 5]

The chemical structure of Chemical Formula 4 is a partial chemical structure including a single bond of phosphorus and nitrogen, and may be represented by $M^+[PO_2O_{1/2}N_{1/3}]^-$ for a monovalent cation, $M^{2+}2[PO_2O_{1/2}N_{1/3}]^-$ for a divalent cation, and $M^{3+}3[PO_2O_{1/2}N_{1/3}]^-$ for a trivalent cation. The chemical structure represented by Chemical Formula 4 may be linked to phosphorus of $M_{1/n}PO_3$ to form two more phosphorus-nitrogen bonds, and as a result, a phosphorus-nitrogen-phosphorus bond may be formed. In addition, $O^-$ may bond to $M^{n+}$, and $O_{1/2}$ may bond to another phosphorus to form a phosphorus-oxygen-phosphorus bond.

The chemical structure of Chemical Formula 5 is a chemical structure including a double bond (P=N) of phosphorus and nitrogen, and may be represented by $2M^+$ $[PO_2O_{1/2}N_{1/2}]^{2-}$ for a monovalent cation, $M^{2+}[PO_2O_{1/2}N_{1/2}]^{2-}$ for a divalent cation, and $2M^{3+}3$ $[PO_2O_{1/2}N_{1/3}]^{2-}$ for a trivalent cation. The chemical structure represented by Chemical Formula 5 may be linked to phosphorus of $M_2PO_3$ to form one more phosphorus-nitrogen bond, and a P=N—P bond may be formed. In the chemical structure of Chemical Formula 5 as well, $O^-$ may bond to $Mn^+$, and $O_{1/2}$ may bone to another phosphorus to form a phosphorus-oxygen-phosphorus bond.

The heat treatment process may be performed under an inert atmosphere such as nitrogen or argon, or under a dry air condition of relative humidity of 5% or less. The temperature of the heat treatment process may be 150° C. or higher and lower than 500° C. Compared to the conventional deposition processes needing to be performed at a high temperature of 500° C. or higher, the process in the present invention may be progressed under a milder condition by forming a precursor layer through a solution process in the step (b).

In addition, the heat treatment process is preferably performed for at least 5 minutes or longer, and the heat treatment process may be performed for, for example, 5 minutes to 1 hour.

The metal-phosphorus-oxynitride protective layer formed from the step (c) may be formed on at least a part of the negative electrode active material described above, and specifically, the protective layer may be formed on a part of the negative electrode active material surface or over the whole surface. As one example, the protective layer may be formed in 50% or greater and preferably in 70% or greater with respect to a total surface area of the negative electrode active material.

In addition, the protective layer may be present in an amount of from 0.01 to 5% by weight and preferably in an amount of from 0.05 to 3% by weight based on a total weight of the negative electrode active material. The protective layer being formed in the above-mentioned range is preferred since ion conductivity is secured as well as improving active material stability.

In one embodiment of the present invention, the protective layer may have a thickness of from 1 to 1000 nm, and preferably from 1 to 100 nm.

By consecutively performing the steps (a) to (c) described above, one protective layer may be formed. After initially forming a protective layer, that is, by performing the steps (b) and (c) again while having a protective layer already formed on a negative electrode active material, another protective layer may be formed, and by repeatedly performing the steps (b) and (c) as above, protective layers are laminated to form a multilayer structured protective layer. In other words, the thickness and the lamination structure of the protective layer may be readily controlled by repeating the processes.

The method for preparing a negative electrode active material described above may readily produce a protective layer including metal-phosphorus-oxynitride or a derivative thereof to have a uniform quality through a metal-phosphorus-oxynitride precursor solution process. In addition, the protective layer prepared using the method has excellent uniformity and coating property, and the negative electrode active material prepared according to the present invention has enhanced reaction stability with an electrolyte liquid, and by having a certain level of ion conductivity by the protective layer, an effective initial irreversibility decrease may be obtained. Accordingly, a lithium secondary battery including the negative electrode active material of the present invention may have improved cycle properties, stability and lifetime properties.

In addition, the present invention provides a lithium secondary battery including the negative electrode active material.

The secondary battery includes a positive electrode; a negative electrode; and a separator and an electrolyte interposed between the positive electrode and the negative electrode, wherein the negative electrode includes the negative electrode active material prepared according to the present invention.

The positive electrode and the negative electrode may be prepared using methods commonly known in the art, and may be prepared by mixing each of a positive electrode active material and a negative electrode active material with a binder, a conductor and the like to prepare electrode slurry, coating the prepared electrode slurry on a current collector, and then rolling and drying the result. Herein, a conductive material and/or a binder may be selectively added in small quantities.

The positive electrode may include a positive electrode current collector, and a positive electrode active material coated on one surface or both surfaces of the positive electrode current collector.

The positive electrode current collector is for supporting the positive electrode active material, and is not particularly limited as long as it has excellent conductivity and is electrochemically stable in a voltage region of a lithium secondary battery.

For example, the positive electrode current collector may be any one metal selected from the group consisting of copper, aluminum, stainless steel, titanium, silver, palladium, nickel, alloys thereof and combinations thereof, and the stainless steel may have its surface treated with carbon, nickel, titanium or silver. As the alloy, aluminum-cadmium alloys may be preferably used, and in addition thereto, baked carbon, nonconductive polymers of which surface is treated with a conductive material, conductive polymers or the like may also be used.

The positive electrode current collector may strengthen binding strength with the positive electrode active material by forming micro-unevenness on its surface, and various forms such as films, sheets, foil, meshes, nets, porous bodies, foams and non-woven fabrics may be used.

The positive electrode active material may selectively include a conductive material and a binder together with the positive electrode active material.

The positive electrode active material may include layer compounds or compounds substituted with one or more transition metals such as lithium cobalt oxide ($LiCoO_2$) or lithium nickel oxide ($LiNiO_2$); lithium manganese oxides such as a chemical formula of $Li_{1+x}Mn_{2-x}O_4$ (0≤x≤0.33), $LiMnO_3$, $LiMn_2O_3$ or $LiMnO_2$; lithium copper oxide ($Li_2CuO_2$); vanadium oxides such as $LiV_3O_8$, $LiFe_3O_4$, $V_2O_5$ or $Cu_2V_2O_7$; Ni site-type lithium nickel oxides represented by a chemical formula of $LiNi_{1-x}M_xO_2$ (M=Co, Mn, Al, Cu, Fe, Mg, B or Ga; 0.01≤x≤0.3); lithium manganese composite oxides represented by a chemical formula of $LiMn_{2-x}M_xO_2$(M=Co, Ni, Fe, Cr, Zn or Ta; 0.01≤x≤0.1) or $Li_2Mn_3MO_8$ (M=Fe, Co, Ni, Cu or Zn); spinel-structured lithium manganese composite oxides represented by $LiNi_xMn_{2-x}O_4$; $LiCoPO_4$; $LiFePO_4$; elemental sulfur ($S_8$); sulfur series compounds such as $Li_2S_n$(n≥1), organosulfur compounds or carbon-sulfur polymers (($C_2S_x)_n$: x=2.5 to 50, n≥2), but is not limited thereto.

The conductive material is a material electrically connecting the positive electrode active material and the electrolyte and thereby performing a role of a path through which electrons migrate from the current collector to the active material, and is used without limit as long as it has porosity and conductivity, and does not cause chemical changes in the formed battery.

For example, carbon-based materials having porosity may be used, and such a carbon-based material includes carbon black, graphite, graphene, activated carbon, carbon fiber and the like, and metallic fibers such as a metal mesh; metallic powders such as copper, silver, nickel or aluminum; or organic conductive materials such as polyphenylene derivatives are included. The conductive materials may be used either alone or as a mixture. Products commercially available as a conductive material may include acetylene black series (products of Chevron Chemical Company or Gulf Oil Company, and the like), Ketjen Black EC series (products of Armak Company), Vulcan XC-72 (products of Cabot Company), Super P (products of MMM) and the like.

The binder is a material included for keeping a slurry composition forming the positive electrode on the current collector, and materials favorably dissolved in a solvent, and capable of stably forming a conducting network with the active material and the conductive material described above are used. Unless particularly limited, all binders known in the art may be used. For example, as the binder, one type selected from the group consisting of fluoro resin-based binders including polyvinylidene fluoride (PVdF) or polytetrafluoroethylene (PTFE); rubber-based binders including styrene-butadiene rubber (SBR), acrylonitrile-butadiene rubber or styrene-isoprene rubber; cellulose-based binders including carboxyl methyl cellulose (CMC), starch, hydroxypropyl cellulose or regenerated cellulose; polyalcohol-based binders; polyolefin-based binders including polyethylene or polypropylene; polyimide-based binders; polyester-based binders; and silane-based binders, or mixtures or copolymers of two or more types thereof may be used.

Like the positive electrode, the negative electrode may include a negative electrode active material, a conductive material and a binder, and herein, the conductive material and the binder are the same as described above.

The negative electrode active material follows the descriptions provided above.

The separator is for physically separating both electrodes in the lithium secondary battery of the present invention, and is not particularly limited as long as it is commonly used as a separator in a lithium secondary battery, and particularly, those having an excellent electrolyte moisture retention ability while having low resistance for ion migration of the electrolyte are preferred.

The separator may be formed with a porous substrate, and as the porous substrate, porous substrates commonly used in an electrochemical device may all be used. Examples thereof may include a polyolefin-based porous membrane or non-woven fabric, but are not limited thereto.

Examples of the polyolefin-based porous membrane may include membranes formed with a polymer using a polyolefin-based polymer such as polyethylene such as high density polyethylene, linear low density polyethylene, low density polyethylene and ultra-high molecular weight polyethylene, polypropylene, polybutylene and polypentene alone, or formed with a polymer mixing these.

Examples of the non-woven fabric other than the polyolefin-based non-woven fabric may include non-woven fabrics formed with a polymer using polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalate and the like alone, or formed with a polymer mixing these. The non-woven fabric structure may be a spunbond non-woven fabric or meltblown non-woven fabric formed with long fibers.

The thickness of the porous substrate is not particularly limited, but may be from 1 to 100 μm, and preferably from 5 to 50 μm.

Sizes of pores and porosity present in the porous substrate are not particularly limited as well, however, the pore size and the porosity may be from 0.001 to 50 μm and from 10 to 95%, respectively.

The electrolyte includes lithium ions, and using them as a medium, produces an electrochemical oxidation or reduction reaction in the positive electrode and the negative electrode.

The electrolyte may be a non-aqueous electrolyte liquid or a solid electrolyte that does not react with lithium metal, but is preferably a non-aqueous electrolyte, and includes an electrolyte salt and an organic solvent.

The electrolyte salt included in the non-aqueous electrolyte liquid is a lithium salt. The lithium salt may be used without limit as long as it is commonly used in an electrolyte liquid for a lithium secondary battery. For example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, $LiN(SO_2F)_2$, chloroborane lithium, lower aliphatic carboxylic acid lithium, lithium tetraphenylborate, lithium imide and the like may be used.

As the organic solvent included in the non-aqueous electrolyte liquid, those commonly used in an electrolyte liquid for a lithium secondary battery may be used without limit, and for example, ether, ester, amide, linear carbonate, cyclic carbonate and the like may be used either alone or as a mixture of two or more types. Among these, ether-based compounds may be typically included.

Examples of the ether-based compound may include at least one selected from the group consisting of dimethyl ether, diethyl ether, dipropyl ether, methylethyl ether, methylpropyl ether, ethylpropyl ether, dimethoxyethane, diethoxyethane, methoxyethoxyethane, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether and polyethylene glycol methylethyl ether, but are not limited thereto.

As the ester among the organic solvents, any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a mixture of two or more types thereof may be used, however, the ester is not limited thereto.

Specific examples of the linear carbonate compound may typically include any one selected from the group consisting of dimethyl carbonate (DMC), diethyl carbonate (DEC), dipropyl carbonate, ethylmethyl carbonate (EMC), methylpropyl carbonate and ethylpropyl carbonate, or a mixture of two or more types thereof, but are not limited thereto.

Specific examples of the cyclic carbonate compound may include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate and halides thereof, or a mixture of two or more types thereof. Examples of the halides thereof may include fluoroethylene carbonate (FEC) and the like, but are not limited thereto.

The electrolyte may include at least one selected from the group consisting of liquid electrolytes, gel polymer electrolytes and solid polymer electrolytes. Electrolytes in a liquid state may be preferably included.

The non-aqueous electrolyte liquid may be injected at a proper stage in an electrochemical device manufacturing process depending on a manufacturing process and required properties of a final product. In other words, the non-aqueous electrolyte liquid may be injected at a stage prior to assembling an electrochemical device or at a final stage of electrochemical device assembly.

The lithium secondary battery according to the present invention may go through lamination (stack) and folding processes of a separator and an electrode in addition to winding, a general process.

An appearance of the secondary battery is not particularly limited, and may employ various shapes such as a cylinder-type, a lamination-type or a coin-type.

MODE FOR INVENTION

Example and Comparative Example: Preparation of Negative Electrode Active Material Example 1

In order to prepare a coating composition including a precursor having a lithium and phosphorus atomic ratio of 2:1, 0.0034 M hexachlorophosphazene and 0.0204 M lithium hydroxide hydrate were dissolved in 20 ml of a water and 2-methoxyethanol mixture (1:19 (volume ratio)) by heating for 40 minutes at 70° C., and the coating composition was prepared.

Under an inert condition, graphite having an average particle diameter of 15 μm was introduced to the coating composition so that the active material ratio became 0.5% by weight with respect to the coating composition, and the result was stirred for 1 hour at 50° C., and then vacuum dried to remove the organic solvent.

Subsequently, heat treatment was carried out at 500° C. under an inert nitrogen condition to prepare a protective layer-formed negative electrode active material.

Example 2

A negative electrode active material was prepared in the same manner as in Example 1 except that the active material ratio with respect to the coating composition including a precursor having a lithium and phosphorus atomic ratio of 2:1 was 0.1% by weight.

Example 3

A negative electrode active material was prepared in the same manner as in Example 1 except that the active material ratio with respect to the coating composition including a precursor having a lithium and phosphorus atomic ratio of 2:1 was 0.05% by weight.

Comparative Example 1

Graphite having an average particle diameter of 15 μm without forming a protective layer was used as a negative electrode active material.

Experimental Example 1. Scanning Electron Microscope Analysis

Negative electrode active materials prepared in Example 1 and Comparative Example 1 were analyzed using a scanning electron microscope (SEM) (model name: S-4800, HITACHI, Ltd.) and an energy dispersive spectroscopy (EDS) (model name: SNE-3000 M, Bruker). The results obtained herein were shown in FIG. 1 to FIG. 4.

Figure 2:
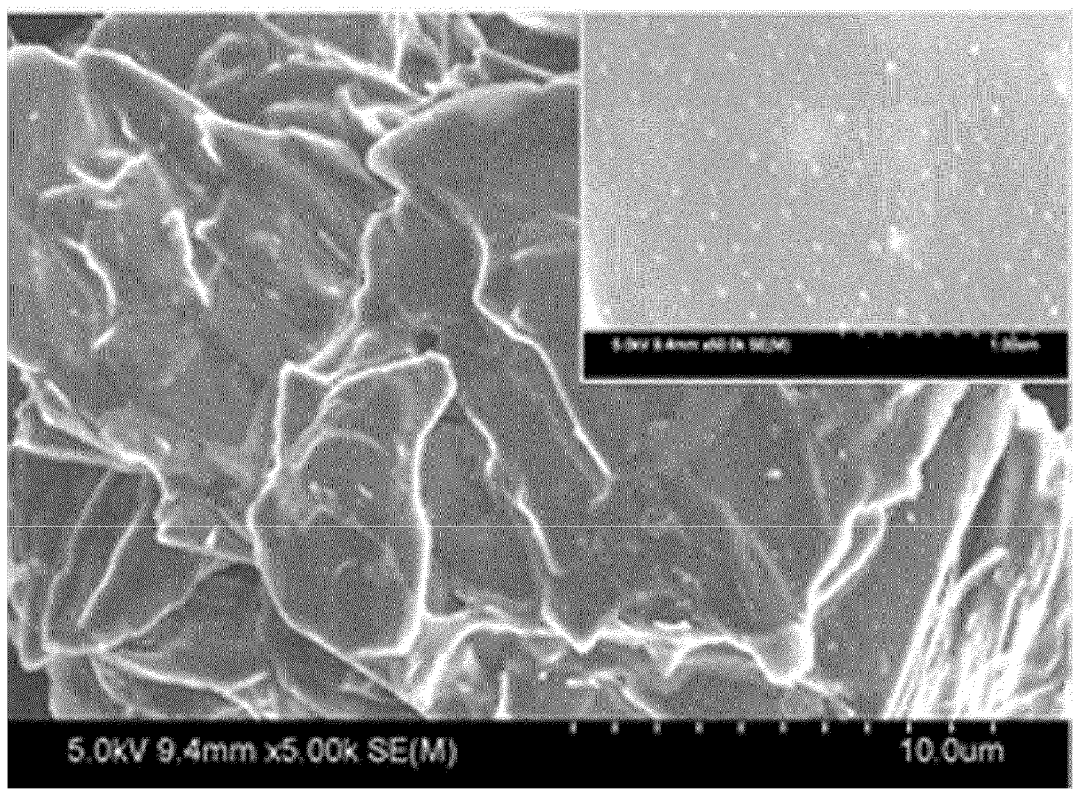
FIG. 2 is a scanning electron microscope image of a negative electrode active material prepared in Example 1 of the present invention.

When referring to FIG. 1, the negative electrode active material of Comparative Example 1 had its surface exposed as it is, whereas, in FIG. 2, it was identified that the negative electrode active material according to Example 1 had a protective layer uniformed formed on the surface.

Figure 3:
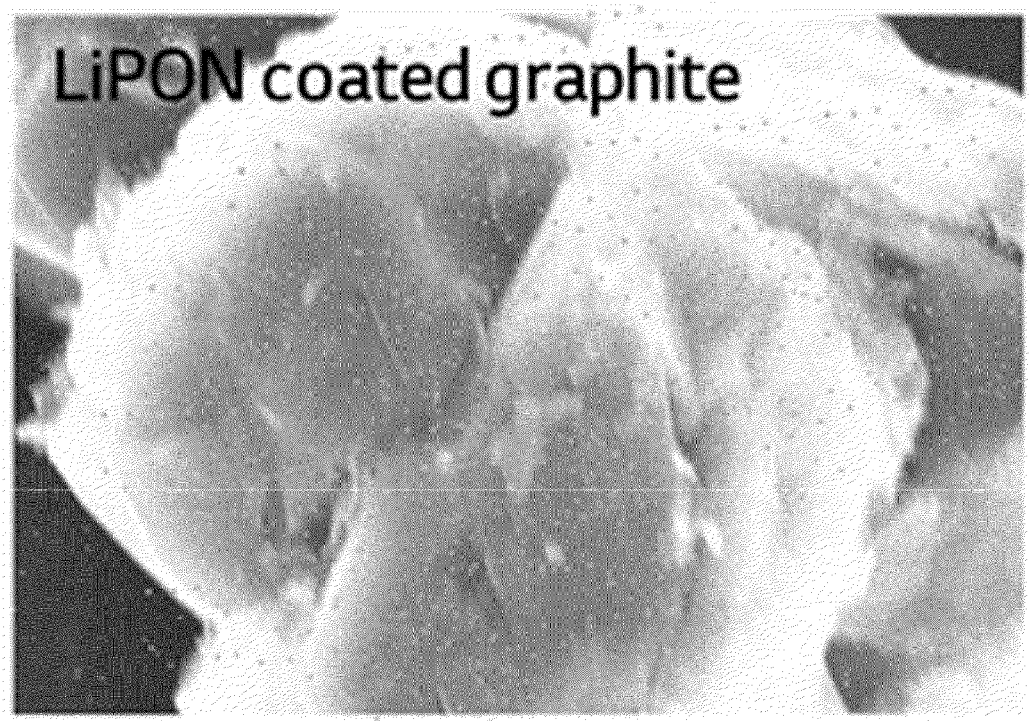
FIG. 3 is an image presenting results of EDS elemental analysis on a negative electrode active material prepared in Example 1 of the present invention.
Figure 4:
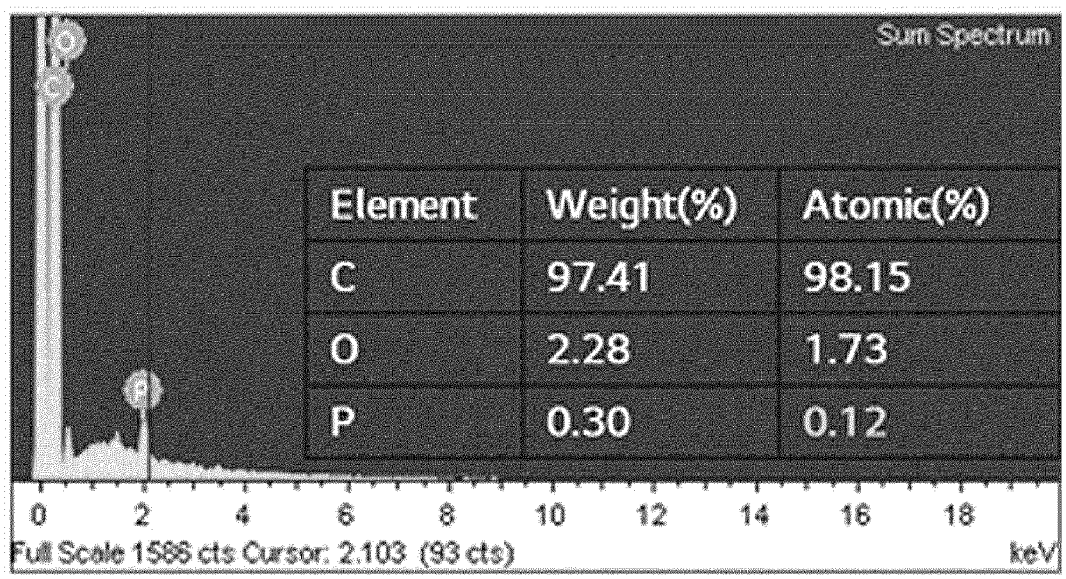
FIG. 4 is an image presenting results of EDS elemental analysis on a negative electrode active material prepared in Example 1 of the present invention.

Specifically, elemental distribution and content of the protective layer can be identified through an EDS elemental analysis. As shown in FIG. 3, a phosphorus (P) element from the precursor of metal-phosphorus-oxynitride is uniformly coated on the whole negative electrode active material surface, and through FIG. 4, it was identified that the content of the phosphorus (P) element was approximately 0.3% by weight.

Experimental Example 2. Battery Performance Evaluation

A negative electrode was prepared using each of the negative electrode active materials prepared in the examples and the comparative example.

Specifically, 0.9 g of each of the negative electrode active materials prepared in the examples and the comparative example, 0.05 g of a binder (PVDFHFP) and 0.05 g of a conductive material (Super C-65) were mixed with N-methylpyrrolidone (NMP) to prepare negative electrode slurry. The negative electrode slurry was coated on a copper current collector having a thickness of 20 μm, and the result was dried to prepare a negative electrode having a thickness of 200 μm.

As a counter electrode, lithium metal foil having a thickness of 150 μm was used.

The negative electrode and the counter electrode prepared above were located to face each other, and after interposing a polyethylene separator therebetween, a 1 M LiPF$_6$-dissolved mixed solvent of ethylene carbonate, diethyl carbonate and dimethyl carbonate (25:50:25 (volume ratio)) was injected thereto as an electrolyte liquid to manufacture a half cell.

For the battery manufactured using the method, initial negative electrode efficiency was evaluated using a constant current-constant voltage method. The results obtained herein were shown in the following Table 1.

TABLE 1

|  | 1$^{st}$ Efficiency (%) |
|---|---|
| Example 1 | 93.45 |
| Example 2 | 92.9 |
| Example 3 | 91.69 |
| Comparative Example 1 | 91.43 |

When referring to FIG. 1, it was identified that the negative electrode including the negative electrode active material according to the present invention had an excellent initial efficiency property compared to the comparative example.

Specifically, it was identified that Examples 1 to 3 forming a protective layer had excellent initial efficiency compared to Comparative Example 1 that did not form a protective layer by suppressing initial irreversibility with the electrolyte liquid.

The invention claimed is:

1. A method for preparing a negative electrode active material comprising:
   (a) preparing a coating composition comprising a precursor of metal-phosphorus-oxynitride;
   (b) forming a precursor layer on a negative electrode active material with the coating composition of (a) using a solution process; and
   (c) forming a metal-phosphorus-oxynitride protective layer on the negative electrode active material by heat treating the negative electrode active material having the precursor layer formed thereon.

2. The method for preparing a negative electrode active material of claim 1, wherein the precursor of metal-phosphorus-oxynitride is prepared by a reaction of a compound comprising a phosphorus-nitrogen bond with a metal salt compound.

3. The method for preparing a negative electrode active material of claim 2, wherein the compound comprising the phosphorus-nitrogen bond comprises at least one selected from the compounds represented by the following Chemical Formulae 1 to 3:

[Chemical Formula 1]

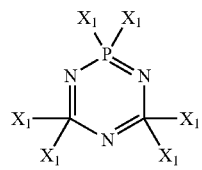

wherein each $X_1$ is the same or different from each other and each independently is $OR_1$, F, Cl, Br or I, wherein $R_1$ is an alkyl group having 1 to 5 carbon atoms;

[Chemical Formula 2]

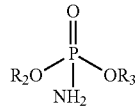

wherein $R_2$ and $R_3$ are the same or different from each other and each independently is an alkyl group having 1 to 10 carbon atoms or an aryl group having 6 to 20 carbon atoms;

[Chemical Formula 3]

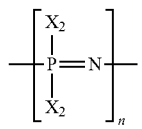

wherein each $X_2$ is the same or different from each other and each independently is $R_4$, $OR_5$, $NR_6R_7$, F, Cl, Br or I, wherein $R_4$ to $R_7$ are the same or different from each other and each independently is an alkyl group having 1 to 10 carbon atoms or an aryl group having 6 to 20 carbon atoms, and n is an integer of 100 to 100,000.

4. The method for preparing a negative electrode active material of claim 2, wherein the metal salt compound comprises at least one metal selected from the group consisting of lithium, sodium, magnesium, calcium, zinc and aluminum.

5. The method for preparing a negative electrode active material of claim 1, wherein the coating composition comprises a compound comprising a phosphorus-nitrogen bond, a metal salt compound and an organic solvent.

6. The method for preparing a negative electrode active material of claim 5, wherein the coating composition comprises, based on a total weight of the composition, the compound comprising the phosphorus-nitrogen bond in an amount of from 0.002 to 27% by weight, the metal salt compound in an amount of from 0.0005 to 12% by weight, and the organic solvent in an amount of from 70 to 99.99% by weight.

7. The method for preparing a negative electrode active material of claim 5, wherein the coating composition further comprises a chalcogen compound.

8. The method for preparing a negative electrode active material of claim 1, wherein the negative electrode active material comprises at least one selected from the group consisting of lithium metal, lithium alloys, transition metal composite oxides, silicon-based materials, tin-based materials and carbon-based materials.

9. The method for preparing a negative electrode active material of claim 1, wherein the negative electrode active material has a spherical, an elliptical, a spindle, a scaly, a plate, a fibrous, a rod, a core-shell or an atypical shape.

10. The method for preparing a negative electrode active material of claim 1, wherein, in step (b), the solution process comprises at least one method selected from the group consisting of spray coating, spin coating, dip coating, inkjet printing, offset printing, reverse offset printing, gravure printing and roll printing.

11. The method for preparing a negative electrode active material of claim 1, wherein, in step (c), the heat treatment is carried out in a temperature range of 150° C. or higher and lower than 500° C.

12. The method for preparing a negative electrode active material of claim 1, further comprising, prior to step (c), removing an organic solvent included in the precursor layer formed from step (b).

13. The method for preparing a negative electrode active material of claim 1, wherein the metal-phosphorus-oxynitride protective layer formed from step (c) comprises amorphous metal-phosphorus-oxynitride.

* * * * *